INVENTOR.
ROBERT G. NICHOLS

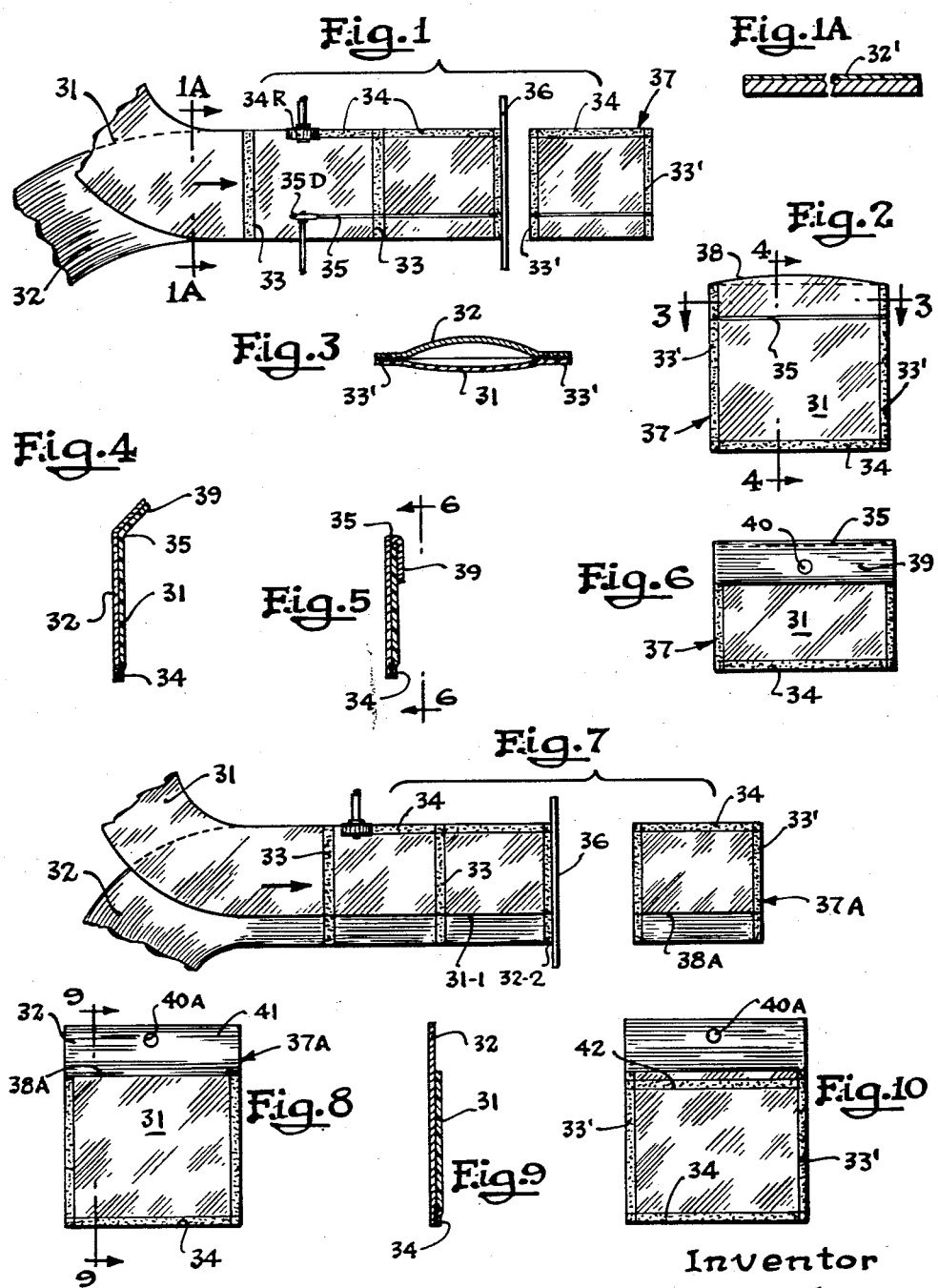

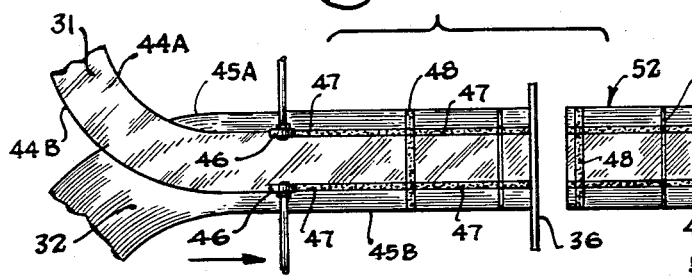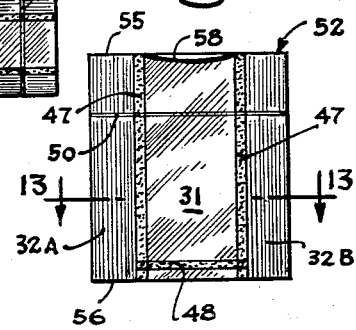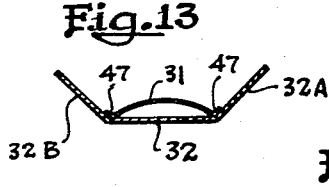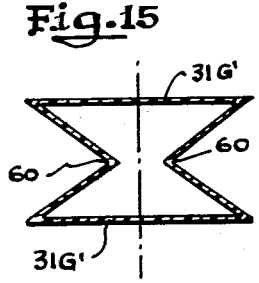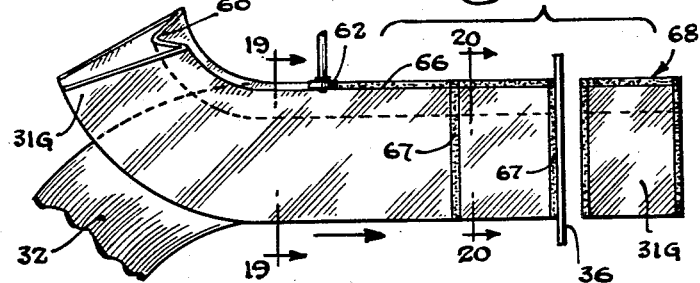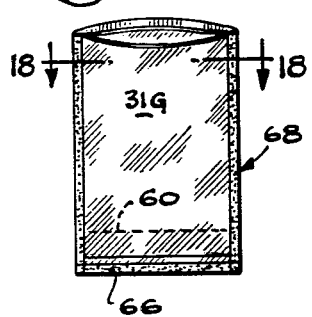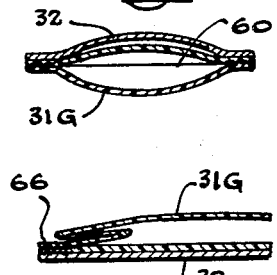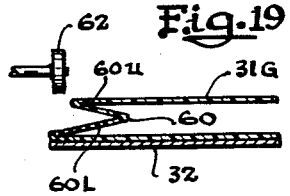
Inventor
Robert G. Nichols
By Wallace, Kinzer and Dorn
Attorneys

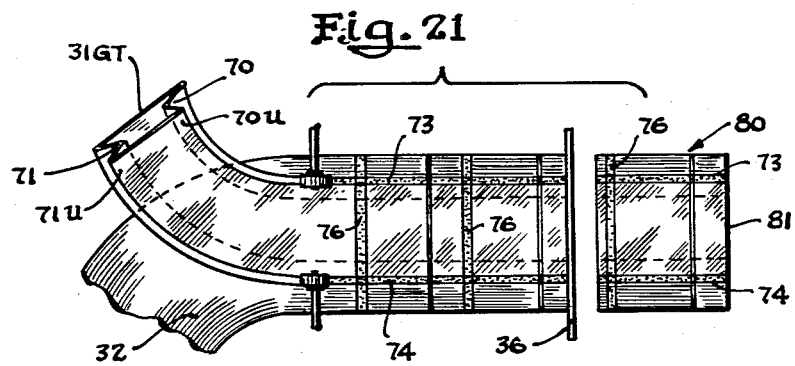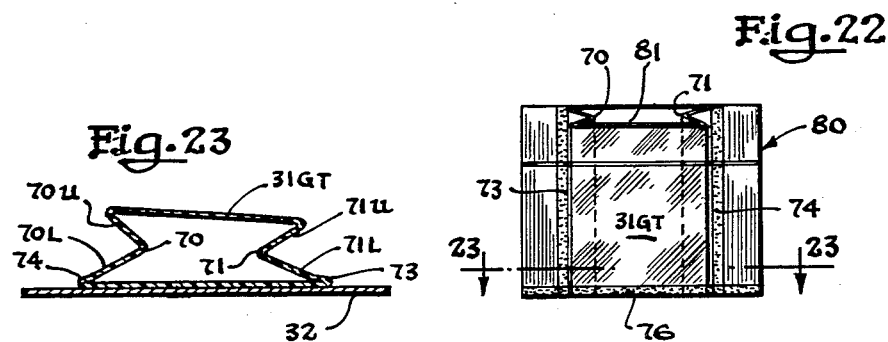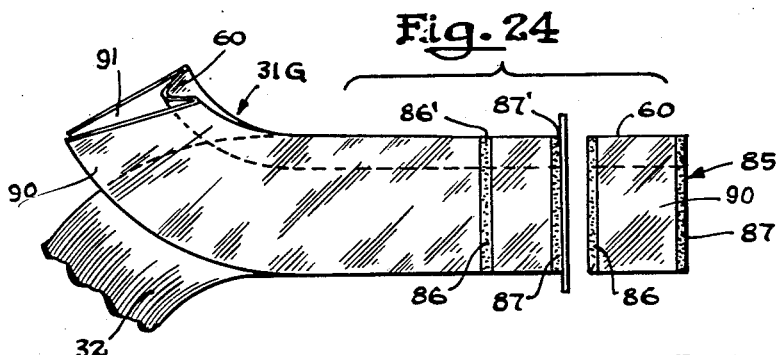

United States Patent Office 3,143,276
Patented Aug. 4, 1964

3,143,276
CONTAINERS
Robert G. Nichols, 211 Skyline Drive, Barrington, Ill.
Filed June 11, 1963, Ser. No. 287,120
3 Claims. (Cl. 229—55)

This invention relates to a container and to a process for producing the container in which two separate materials are sealed together to form the envelope portion of the container, the first one of the materials being a thermoplastic plastic film of flimsy nature such as polyethylene or polypropylene, and the second one of the materials being a more rigid material. The second material may be treated to facilitate the bonding of the two materials, and an example of this is paperboard as the second material, itself laminated or coated with polyethylene prior to heat sealing the same to a sheet of polyethylene film as the first material.

Thus, an example of a container produced under the present invention would be one in which the first material is polyethylene film and the second material is paperboard having a coating of polyethylene. The first and second materials are in the form of webs arranged in face-to-face position and may be so dimensioned and cut as to produce containers having two sheets of unequal dimension. The first material is preferably a tube and may include a gusset, and the second material may be scored. The second material is arranged so that the side bearing the polyethylene coating is juxtaposed on the first material for face-to-face sealing.

When so arranged, the first and second materials are sealed together, preferably by two spaced heat seals made transversely across the webs of the first and second materials perpendicular to the free edges of said webs.

Such constructions represent objects of the present invention.

Other objects of the present invention are to enable thick or bulky goods to be packaged in a container of the aforesaid character without apprehension of buckling the sheet of more rigid material, to enable this to be accomplished while making provision for a gusset bottom or side in the container, to afford a lined backing or support of novel form for the container that resists bending stresses and which in fact is somewhat yieldable, or stretchable, and to prevent inadvertent emplacement of goods in a container having such a double-ply thickness.

In its preferred form, the container of the present invention is one in which the second material is sealed to the first material along three marginal edge portions with a fourth edge free to enable the resultant pocket to be filled. Additionally, the first material is of tube form and may include a gusset bottom or gusset side, and consequently, the goods are supported by a double ply back. One ply is the second material and the other ply is one panel of the first material in tube form, having an end bonded to the second material thereby to facilitate use of the container as will be explained. Such constructions amount to other objects of the present invention.

Other and further objects of the present invention will be apparent from the following description and claims and are illustrated in the accompanying drawings which, by way of illustration, show preferred embodiments of the present invention and the principles thereof and what are now considered to be the best modes for applying these principles. Other embodiments of the invention embodying the same or equivalent principles may be made as desired by those skilled in the art without departing from the present invention and the purview of the appended claims.

In the drawings:

FIG. 1 is a diagrammatic view illustrating the production of a container of the kind illustrated in FIG. 2;

FIG. 1A is a sectional view on an enlarged scale on the line 1A—1A of FIG. 1;

FIG. 2 is a view illustrating a container produced by the procedure shown in FIG. 1;

FIG. 3 is a sectional view on the line 3—3 of FIG. 2;

FIG. 4 is a sectional view on the line 4—4 of FIG. 2;

FIG. 5 is a sectional view similar to FIG. 4 showing a different stage of completion of the container;

FIG. 6 is a plan view taken on the line 6—6 of FIG. 5;

FIG. 7 is a diagrammatic view illustrating another method of production to produce the container of FIG. 8;

FIG. 8 is a view illustrating a container produced by the procedure of FIG. 7;

FIG. 9 is a sectional view on the line 9—9 of FIG. 8;

FIG. 10 is a view illustrating one way in which the container of FIG. 8 may be completely sealed;

FIG. 11 is a diagrammatic view illustrating another procedure of manufacture under the present invention;

FIG. 12 is a view on an enlarged scale of a container produced by the procedure of FIG. 11;

FIG. 13 is a sectional view on the line 13—13 of FIG. 12;

FIG. 14 is a view similar to FIG. 13 but illustrating another modification;

FIG. 15 is a sectional view of the original form of tubing of which half is used in the procedure of FIG. 16;

FIG. 16 is another procedure for producing containers or bags under the present invention;

FIG. 17 is a view of a container produced in accordance with the procedure of FIG. 16;

FIG. 18 is a sectional view on the line 18—18 of FIG. 17;

FIGS. 19 and 20 are sectional views illustrating stages of production of the container of FIG. 17;

FIG. 21 is a diagrammatic view illustrating another method of manufacture under the present invention;

FIG. 22 is a view of a container produced in accordance with FIG. 21;

FIG. 23 is a sectional view on the line 23—23 of FIG. 22;

FIG. 24 illustrates the production of still another container produced under the present invention;

Figure 25:
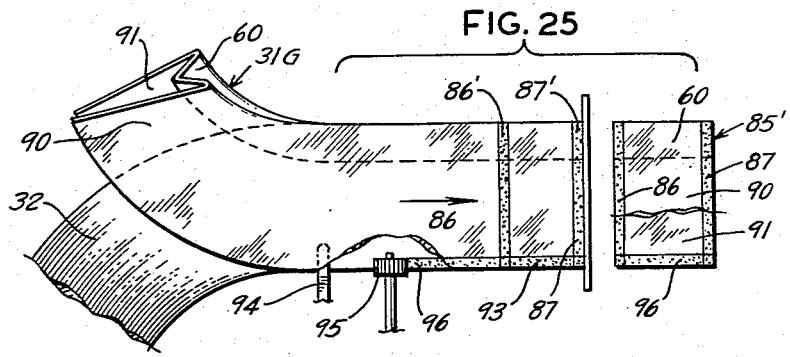
FIG. 25 illustrates the production of still another container produced under the present invention.

The container illustrated in FIGS. 1 to 6 is one wherein the first and second materials are sealed together by two seals made transversely across the webs of the first and second materials perpendicular to the free edges of said webs. The materials are scored to provide a flap. The first and second materials are further sealed along one of the free edges, this further seal extending between and to each of said perpendicular seals to provide a container pocket sealed on three sides with the fourth or unbonded side providing the open end of the container or bag.

Thus, FIG. 1 illustrates one method of manufacturing a container in which 31 represents the first material, which is polyethylene film or equivalent thermoplastic film, and 32 represents the second material which is paperboard more rigid than the film 31. Referring to FIG. 1A, the material 32 bears a coating 32' of polyethylene to facilitate bonding of the material 32, by a heat seal, to the material 31. This is true of all the modifications hereinafter described, and is to be understood in the description to follow.

The first and second materials are initially in web form, being supplied from supply rollers, not shown. Spaced cross seals 33 unite the materials 31 and 32 transversely across the webs, such being effected as by heat seal rollers, not shown, although a like roller 34R completes a continuous heat seal 34 along the length of the web materials perpendicular to each of said cross seals. The seal 34 represents the bottom seal of the finished container as will be evident hereinafter.

A knife 36 severs the cross seals 33 approximately in half so that each half becomes a sealed edge 33' of another and completed container.

A completed container is identified by reference character 37, such having an open end 38, FIG. 2, enabling the resultant pocket encompassed by the heat seals to be filled. It may be here mentioned that the free edge of the stiffer material 32 at the open end of the bag facilitates peeling back the free edge of the thin, adherent film 31 (see FIG. 3) to expose the interior of the envelope area for filling. After filling, the free or remaining unbonded edges of the sheet 31 will be heat sealed to the sheet 32 in the manner evident from FIG. 10 hereinafter discussed.

Either or both of the first and second materials may be printed with advertising or other such information, and the second material, of paperboard or like material capable of holding a crease, is scored for subsequent folding. An example of this would be that where the second material is to have a score line formed therein parallel to the open end of the bag or receptacle. The dimension separating the open end and the score line may be of any desired distance; then, after the container is filled with a product, the first and second materials are folded at the score line to close the open end of the container. After folding, the fold may be secured in an ultimate position by means of stapling or sealing. A hole may be punched through the folded portion for hanging the filled container for display.

Thus, a scoring disc 35D, FIG. 1, is provided to produce a score line 35 parallel to the seal 34, somewhat inward of and parallel to what will be the open end of the resultant containers for reasons to be explained.

FIGS. 4 to 6 illustrate this in connection with the score line 35. Thus, by providing such a score line as 35, this produces in effect a flap 39 which can be accurately folded along the score line 35 to enclose the contents. The folded-over flap 39 (front or back) can be secured to the adjacent material of the container in any desired manner, and the container may be provided with an opening 40 therethrough at the flap to enable the container 37 and its contents to be displayed on a hook.

By omitting the seal 34, but nevertheless slitting the seals 33 in half as above described, the result is containers having two open ends, and which containers can be filled and the free ends of the film then tucked inward. It can be seen that this procedure affords an inexpensive container but one which can be used attractively to display goods.

Another variation, FIGS. 7 and 8, is one in which the first and second materials are arranged in face-to-face position with three equal or colineal edge extremities, but the fourth edge of one of the materials extends beyond the corresponding edge of the other to any desired extent. The first and second materials used for this container are then bonded in the same manner previously described to provide a container bonded on three sides with a fourth open side or end. In this example, the fourth or open side is that side having the unequal edge extremities. If polyethylene as the first material has its fourth edge extended beyond the fourth edge extremity of the second material represented by paperboard, the free polyethylene portion may be used as a tuck-in flap after filling the bag, or as a fold-over flap to envelope the open end by folding the same over to the reverse side of the second material and affixed in this position by stapling or sealing.

If paperboard, used for the second material, has its fourth edge extended beyond the fourth or unbonded edge of the first material, the extended portion may be scored to form a tuck-in flap or fold-over flap as aforesaid. After folding, the paperboard flap may be affixed in its folded position by stapling or sealing, after filling.

Thus, FIG. 7 illustrates the formation of a container in which the first and second materials 31 and 32 for a corresponding bag 37A are of unequal width compared to one another, and although not indicated, it can readily be seen that the second material 32 can be scored as in FIG. 1 for subsequent folding as in FIGS. 4 and 5.

The webs 31 and 32 are arranged so that the two are colineal along one edge as shown in FIG. 7, with their respective other edges 31–1 and 32–2 spaced one from another but parallel. In this instance, the web 32 is the wider one.

Heat seals 33 and 34 are produced as described above in FIG. 1, and a cutter 36 is active to sever in half the seals 33 to produce containers 37A having open ends 38A and a flap 41 which extends free of the free edge of the sheet 31 adjacent the open end 38A of the resultant container. The flaps 41 can be printed, folded over as above described, or provided with an opening 40A for the purpose described above.

In any event, and this applies to all the containers described herein, the open end of the bag, after filling, can be closed by a heat seal, illustrated in FIG. 10 at 42.

Another variation of the container of the present invention is one in which the first and second materials are juxtaposed in face-to-face position with two edge extremities parallel to each other but separated by a given amount. In other words, one of the sheets is wider than the other in one direction, and the other is centered thereon resulting in two marginal portions of the one material free of the other.

In connection with the disclosure set forth immediately above, the example is disclosed in FIG. 11 where two edges of paperboard as the second material extend beyond two corresponding edges of polyethylene film as the first material. The polyethylene is then bonded to the second material along the free edges of the film material. Other bonds extend perpendicular to the aforementioned bonds.

Thus, in connection with the disclosure immediately above, FIG. 11 illustrates a method of manufacturing a container in which both edges 44A and 44B of the film material 31 are spaced equally inward of the edges 45A and 45B of the paperboard material 32. Sealers such as heat seal rollers 46 produce two continuous, elongated seals 47 which bond 31 to 32 parallel to the length of the webs. Cross or transverse seals 48 are then made transversely in a similar way, also bonding 31 to 32 along widely spaced, parallel strips.

By omitting the cross seals 48, and instead, severing the sheets 31–32 at these transverse lines, open-ended containers can be obtained.

Score lines 50 may be provided in the manner described above, and again a knife 36 shears off each container, but this time just "below" the cross seals to provide finished containers 52 in which the top and bottom edges 55 and 56 represent the equal extremity (colineal) edges of the first material 31 and the second material 32. The open end of this container is represented at 58, FIG. 12.

This procedure shown in FIG. 11 again forms a container with three sides bonded and a fourth side unbonded to afford an open end for filling. The container or actual bag dimensions are, by this process, limited to the edge extremities of the first material, that is, the thermoplastic film mentioned, and the second or stiffer backing material has marginal portions which extend beyond the corresponding edge extremities of the first material for purposes to be mentioned.

The extra material afforded by having the paperboard sheet wider on both sides in comparison to the plastic film results in a container 52, FIG. 12, having stand-up flaps 32A and 32B which can be bent back to enable the container 52 to be set stably in an upright position for display on a counter.

FIG. 14 is a somewhat exaggerated view of a container produced by the method of FIG. 11 in which the extremities of the second material 32 are sufficiently beyond the extremities 44A and 44B of the first material 31 (FIG. 11) to permit scoring for complete envelopment and protection of the first material, while at the same time affording a closure overlap 55.

Extra material provided by the extensions 32A and 32B in the paperboard, free of the film material in the modifications described immediately above in connection with FIGS. 11 to 14, may be used for additional printing or die cutting. They may be scored and/or slotted to provide a stand-up display, or folded over to protect the packaged product. These extensions can be secured in any desired position by interlocks, adhesives or the like. The open fourth end of the container may be closed by bonding the first material to the second material parallel to the equal unbonded extremities just below the open end. This open end may also be closed as aforesaid by having resort to the score line 50, FIG. 12, in the second material adjacent the open end, and of any desired distance from said open end, enabling the first and second materials to be folded at such score line to overlie the open end of the bag, such folding providing a flap which may be secured by either stapling or bonding.

Gussets can be afforded for enlarged receptacles or containers in accordance with the present invention. Such gussets may be either of two separate forms. In the first form, the gusset is so arranged as to provide a single bottom gusset. It is possible to form such a bottom gusset during the assembly of the first and second materials, but for simplicity of manufacture, it is preferred to use thermoplastic film material such as polyethylene as preformed gusseted tubing for the first material. Plain or ungusseted tubing may also be used for a double-ply backing as explained hereinafter.

The gusseted tubing may be of standard type commonly extruded into a seamless tube, or it may be a formed tube. In any event, the gusseted tube includes what can be designated as upper and lower gusset flaps and upper and lower panels. Under the present invention, the lower gusset flap and panel is that portion of the gusset tube which is outermost of the second material.

Referring to FIGS. 15 to 20, the first material is gusseted polyethylene 31G, FIG. 16, superimposed on the second material, which is paperboard as aforesaid. The two are of the same width, but the sheet 31G was originally of closed tube, double gusseted form 31G' FIG. 15, slit along the center line shown in FIG. 15 to provide two sheets or webs 31G' each having a single gusset. Alternatively, the first material could be a flat sheet folded upon itself to afford the gusset or pleat. The second material is paperboard 32.

The first material, the film 31G, is placed in web form in position for bonding to the second material 32, and the gusset 60 is so positioned that the gusset crease is parallel to the open end and to the bottom, being nearest the open end. When the gusset is opened or expanded to its limits, it will form an expansive bottom for the related container.

The lower gusset flap may be sealed to the second material to affix it firmly thereto and to facilitate this it may be advantageous, as shown in FIG. 19, to so form the tubing that what will be the lower gusset flap 60L will protrude beyond what will then become the upper gusset flap 60U. In other words, the gusset flaps are asymmetrical, enabling the lower gusset flap to be placed directly under a heat sealer 62 incidental to bonding the materials without interference from the upper gusset flap. Of course the upper gusset flap could be mechanically removed from the path of the sealer to permit access of the sealer to the lower gusset flap.

Transverse seals 67 are provided to complete closure on three sides of the containers 68 produced by this process and each having the usual open end, this time at the end of the container opposite the gusseted bottom.

As usual, the second material, the more rigid one, can be scored for folding, and closure of the open end may be of any of the means previously mentioned.

In the second variation of the gusseted container (see FIG. 22) the first and second materials may have two equal edge extremities and two unequal edge extremities, although both materials may have four equal sides in the general disposition exemplified by FIG. 17. The form having unequal edge extremities is the one illustrated in FIG. 22, and these unequal edge extremities will be referred to as the sides of the first material and the sides of the second material.

The first material is, for example, a gusset tube 31GT, FIG. 23, of polyethylene film with two gussets 70 and 71 parallel and opposite each other, and the second material 32 is, for example, paperboard coated with polyethylene as in all the foregoing embodiments. The tube 31GT is identical to the tube 31G', FIG. 15, prior to slitting.

The first material 31GT in web form is positioned on the second material 32 in web form in such a way that the gussets are parallel to the free edges of the second material, noting that the tube 31GT in its flattened or unexpanded state is narrower than the web of second material 32.

By means previously mentioned for sealing the aforesaid bottom gusset flap 60L, the side gussets 70 and 71 are each bonded at 73 and 74 to the second material by heat sealing what are the lower gusset flaps 70L and 71L to the second material along the seal. Thus, the lower gusset flaps 70L and 71L preferably project beyond the upper gusset flaps 70U and 71U. The seals 73 and 74 are continuous along the length of the webs.

The first material, the gusseted thermoplastic film tube 31GT, is sealed along spaced areas 76 transverse to the seals 73 and 74, noting that here the gussets are sealed to themselves and to the second material.

As in FIG. 21, the knife 36 is effective just "below" the seal 76 to provide an open end or edge 81 in the resultant container 80. Thus, the fourth edge is unbonded to provide a container 80 having an open end 81, and the second material may be scored, slotted, or die cut as previously mentioned. Final closure of the fourth edge may be accomplished by any of the means mentioned above.

Another variation of container produced under and in accordance with the present invention is illustrated in FIG. 24. The bag or container in this instance is produced much in the manner illustrated in FIG. 16, and similar reference characters are used, except that the roller 62, effective to seal one of the gusset flaps to the stiffer material is not used.

Thus, referring to FIG. 24, gusseted film material 31G is juxtaposed on stiffer paper 32, and spaced transverse heat seals are afforded that effectively include the corners or ends 86' and 87' of the gusset 60, whereby the major portion of the gusset is not heat sealed to the stiffer material, in contrast to the bag 68. The resultant containers as 85 are, therefore, similar to the container 68 above described except that the heat seal 66 is not present.

The bag or container 85', FIG. 25, is produced in a fashion similar to the method shown and described in connection with FIG. 24, as will be evident from the similarity in reference characters, and hence only the single difference, including an additional heat seal, will be described below.

The tubing 31G for the containers 85 and 85' presents, in addition to the gusset 60, top and bottom film panels. The bottom panel 91 is juxtaposed as a lining on the stiffer backing sheet 32, and the top panel 90 is juxtaposed on the bottom panels 91. Resultantly, both for the containers 85 and 85', the backing sheet 32 is lined by a pliant, somewhat stretchable panel 91 of thermoplastic film, and it is found that not only does this afford additional support for the goods to be packaged, but it enables bulkier or thicker goods to be packaged in the resultant bag without causing buckling or creasing of the paperboard sheet due to the resultant concave-convex bend in the sheet 32 in comparison to containers not having such a liner or panel 91, as for example, the container of FIG. 12. This result is in part due to the ability of the bottom panel 91 of thermoplastic film to withstand stretching or bending stresses in comparison to the unlined paperboard sheet 32 per se, aside from the inherent lining which the plastic film 91 affords for the backing support.

Figure 26:
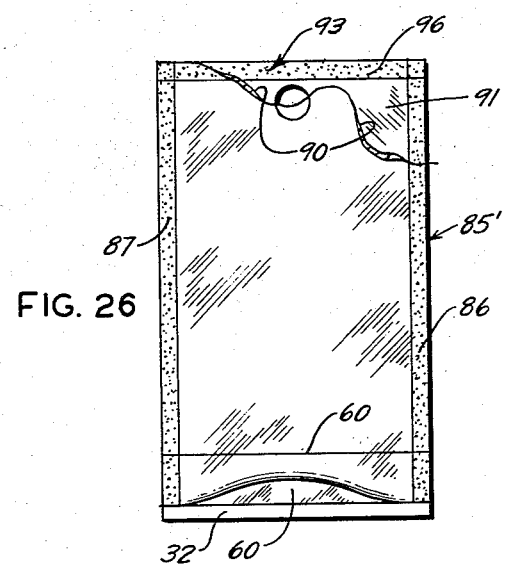
FIG. 26 is an enlarged view of a bag or container produced by the method shown in FIG. 25.

Now referring to FIGS. 25 and 26, it is preferred to bond the free edge of the bottom panel 91 to the sheet 32 at the mouth 93 of the bag. This is accomplished by spreading the panels 90 and 91 of the web 31G with an inserter blade 94, permitting a heat seal roller 95 to be interposed between the spread panels 90 and 91 to thereby heat seal the free edge of the bottom panel 91 to the backing sheet 32. Resultantly, it is the top panel 90 only that is free of the second material 32 at the mouth 93 of the bag, and hence there is no likelihood of accidently filling the bag with goods between the sheet 32 and the bottom panel.

Figure 27:
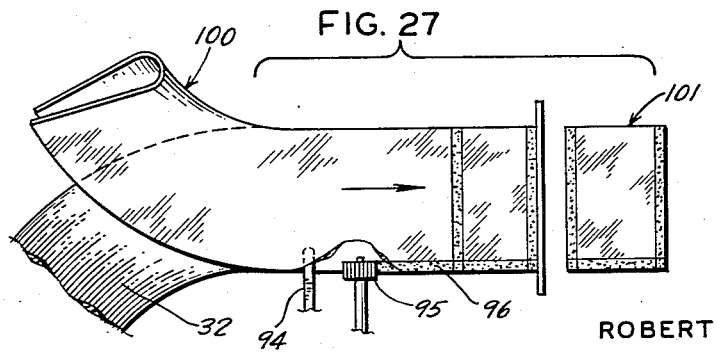
FIG. 27 illustrates the production of still another container produced under the present invention.

A gusset bottom 60 is not essential to realizing the advantages of the second panel 91, particularly from the standpoint of packaging thick, bulky goods without creasing or buckling the paperboard sheet. Thus, referring to FIG. 27, a plain or ungusseted tube 100 of thermoplastic material is juxtaposed on the second material represented by the web 32 of stiffer material, paperboard, for example, coated as aforesaid as an aid to heat seal bonding. An inserter blade and auxiliary heat seal roller 95 are used in the manner explained above in connection with FIG. 25, and the resultant container 101 is identical to the container 85' except for the gusset bottom. The containers of FIGS. 24, 25 and 27 all include (1) a pocket or envelope for packaging goods and having a folded or otherwise closed bottom end, plain or gusset, (2) top and bottom panels bonded at their sides to a flexible supporting sheet of stiffer material by heat seals and joined integrally to one another at the closed bottom, and (3) an open mouth presented by substantially colineal edges of the panels at the end of the container opposite the closed bottom. Preferably the bottom is of gusset form and the top edge of the bottom panel is bonded to the sheet of stiffer material as shown in FIG. 26.

As noted above, the containers may be scored to enable the same to be folded along the score lines, and the scoring means can be one operating either on the pressure principle or on a heat principle. Thus, the score lines may be provided by elements having hot edges, in which event the score lines are provided without any particular pressure deformation of the second, more rigid material. Moreover, the second more rigid sheet, particularly in the instance of the second material heavily coated with plastic, or a relatively rigid plastic sheet itself as the second material, can be deformed by a hot die to provide a cavity or pocket substantially complemental to the geometry or the shape of the articles to be packaged.

While the present invention has been described from the standpoint of the preferred materials, polyethylene film and somewhat more rigid paperboard coated with polyethylene film, to develop heat seals as the preferred bonds between the materials, other film materials can be used capable of compatible sealing or bonding including Saran, Pliofilm and polypropylene as the first material, any one of which film materials is heat sealable to paperboard coated with one of these materials or with polyethylene, and sheets of foam plastic, as the more rigid material, compatible with any of the films mentioned. These are among the proprietary-name film materials, and obviously other, equivalent materials are yet to be developed or marketed.

This application is a continuation-in-part of application Serial No. 212,197, filed July 25, 1962, now abandoned.

I claim:

1. A container comprising first and second different materials of which the first material consists of a tube of thermoplastic film presenting a closed bottom and a pair of panels and of which the second material is a sheet of material stiffer than the first material, said first material being juxtaposed on said sheet so that one of said panels is a bottom panel juxtaposed directly over said sheet to serve as a lining for the sheet and the other panel is juxtaposed directly over said bottom panel, said panels being bonded to said sheet along spaced parallel lines that are transverse to said closed bottom, and said panels being free of one another at the end of the tube opposite said closed bottom to afford an open mouth enabling the tube to be filled with goods to be contained between said panels, said bottom panel by virtue of its plasticity and lining nature enabling said sheet to be distorted by bulky goods inserted into said tube without buckling.

2. A container according to claim 1 wherein the bottom panel which is a liner for said sheet is bonded to said sheet at its edge opposite said closed bottom.

3. A container according to claim 1 wherein said closed bottom is characterized by a gusset fold.

References Cited in the file of this patent

UNITED STATES PATENTS

| | | |
|---|---|---|
| 904,083 | Parmenter | Nov. 17, 1908 |
| 2,298,421 | Salfisberg | Oct. 13, 1942 |
| 2,805,814 | Calasibetta et al. | Sept. 10, 1957 |
| 3,026,016 | Scher | Mar. 20, 1962 |
| 3,027,065 | Lindquist | Mar. 27, 1962 |